(12) United States Patent
Sukhman et al.

(10) Patent No.: US 7,469,000 B2
(45) Date of Patent: Dec. 23, 2008

(54) GAS LASERS INCLUDING NANOSCALE CATALYSTS AND METHODS FOR PRODUCING SUCH LASERS

(75) Inventors: Yefim P. Sukhman, Scottsdale, AZ (US); Vladimir M. Cherezov, Phoenix, AZ (US); Patrick R. Thornton, Phoenix, AZ (US); Stefano J. Noto, Mesa, AZ (US)

(73) Assignee: Universal Laser Systems, Inc., Scottsdale, AZ (US)

( * ) Notice: Subject to any disclaimer, the term of this patent is extended or adjusted under 35 U.S.C. 154(b) by 0 days.

(21) Appl. No.: 11/603,513

(22) Filed: Nov. 22, 2006

(65) Prior Publication Data

US 2008/0117949 A1 May 22, 2008

(51) Int. Cl.
*H01S 3/22* (2006.01)
(52) U.S. Cl. .............................. 372/59; 372/55; 372/57
(58) Field of Classification Search .................. 372/59, 372/55
See application file for complete search history.

(56) References Cited

U.S. PATENT DOCUMENTS

| | | | |
|---|---|---|---|
| 4,617,668 A * | 10/1986 | Rudko et al. .................. 372/59 |
| 4,651,324 A | 3/1987 | Prein et al. |
| 4,756,000 A | 7/1988 | Macken |
| 4,757,512 A | 7/1988 | Macken |
| 4,897,848 A | 1/1990 | Macken |
| 5,216,689 A | 6/1993 | Gardner et al. |
| 5,260,961 A | 11/1993 | Zhou et al. |
| 5,337,329 A | 8/1994 | Foster |
| 5,661,746 A | 8/1997 | Sukhman et al. |
| 5,771,259 A | 6/1998 | Dvorkin |
| 5,867,517 A | 2/1999 | Sukhman et al. |
| 5,881,087 A | 3/1999 | Sukhman et al. |
| 5,901,167 A | 5/1999 | Sukhman et al. |
| 6,181,719 B1 | 1/2001 | Sukhman et al. |
| 6,944,202 B2 | 9/2005 | Zuppero et al. |
| 6,983,001 B2 | 1/2006 | Sukhman et al. |
| 2004/0127353 A1* | 7/2004 | Wu et al. ..................... 502/344 |

FOREIGN PATENT DOCUMENTS

| | | |
|---|---|---|
| GB | 1256398 | 12/1971 |
| GB | 2028571 | 3/1980 |
| GB | 2107109 | 4/1983 |

OTHER PUBLICATIONS

Sanchez, A. et al. "When Gold is Not Noble: Nanoscale Gold Catalysts". J. Phys. Chem. A 1999, 103, 9573-9578. Oct. 8, 1999.

* cited by examiner

*Primary Examiner*—Dung T Nguyen
(74) *Attorney, Agent, or Firm*—Perkins Coie LLP (57) ABSTRACT

Gas lasers including nanoscale catalysts and methods for producing such lasers are disclosed herein. In one embodiment, a gas laser includes a gas containment structure having a gas discharge region and a laser gas medium in the gas discharge region. The gas laser also includes a plurality of optical elements spaced apart from each other at opposite ends of the gas discharge region to form a laser resonator. The gas laser further includes a nanoscale catalyst proximate to and in communication with the gas discharge region to modify oxidation and/or decomposition processes of selected components of the laser gas medium. In one embodiment, the nanoscale catalyst can include a metal-oxide support substrate carrying a plurality of nanoscale particulates. The nanoscale particulates can be composed of one or more of the following: gold, silver, or platinum, and have an average size of about 1-50 nm.

36 Claims, 5 Drawing Sheets

GAS LASERS INCLUDING NANOSCALE CATALYSTS AND METHODS FOR PRODUCING SUCH LASERS

TECHNICAL FIELD

The present disclosure is directed generally to lasers and, more particularly, to gas lasers including nanoscale catalysts and methods for producing such lasers.

BACKGROUND

Lasers are ubiquitous devices used for testing, measuring, printing, cutting, marking, medical applications, communications, data transmission, semiconductor processing, and many other applications. Many types of lasers have been developed to meet different performance criteria for different applications. Engraving, cutting, marking, printing, and many other applications require relatively compact lasers that generate high power output and have beams with a desired shape and energy distribution. Gas lasers, such as carbon dioxide ($CO_2$) lasers, are useful in such applications because they can generate continuous, high power output in a relatively compact package.

Carbon dioxide lasers generally include a gas containment structure containing a laser medium, electrodes for providing an electrical discharge within the laser medium, and optics at each end of the containment structure. The laser medium in most $CO_2$ lasers includes a gas mixture of $CO_2$, nitrogen, and helium. The $CO_2$ produces the laser light, the nitrogen helps increase the laser's efficiency by transferring its excitation energy to the $CO_2$ molecules during collisions between the nitrogen and $CO_2$ molecules, and the helium serves to depopulate the lower laser level and remove heat from the laser medium. In some applications, the gas mixture can also include hydrogen ($H_2$), water vapor, xenon, and/or other gases to perform other functions.

One well-known drawback with $CO_2$ lasers is that the electrical discharge that excites the laser medium also causes the $CO_2$ to dissociate into CO and oxygen ($O_2$). More specifically, the energy of the electrical discharge in the gas mixture excites the nitrogen molecules to an elevated oscillating level. During excitation, this stored potential energy is transferred from nitrogen to the oscillating levels of $CO_2$ molecules, which results in a population inversion between the oscillating levels of the $CO_2$. As the $CO_2$ settles from this higher-energy state, photons are released, resulting in laser radiation. The other components of the laser medium (e.g., He and Xe) do not participate in this reaction.

Figure 1:
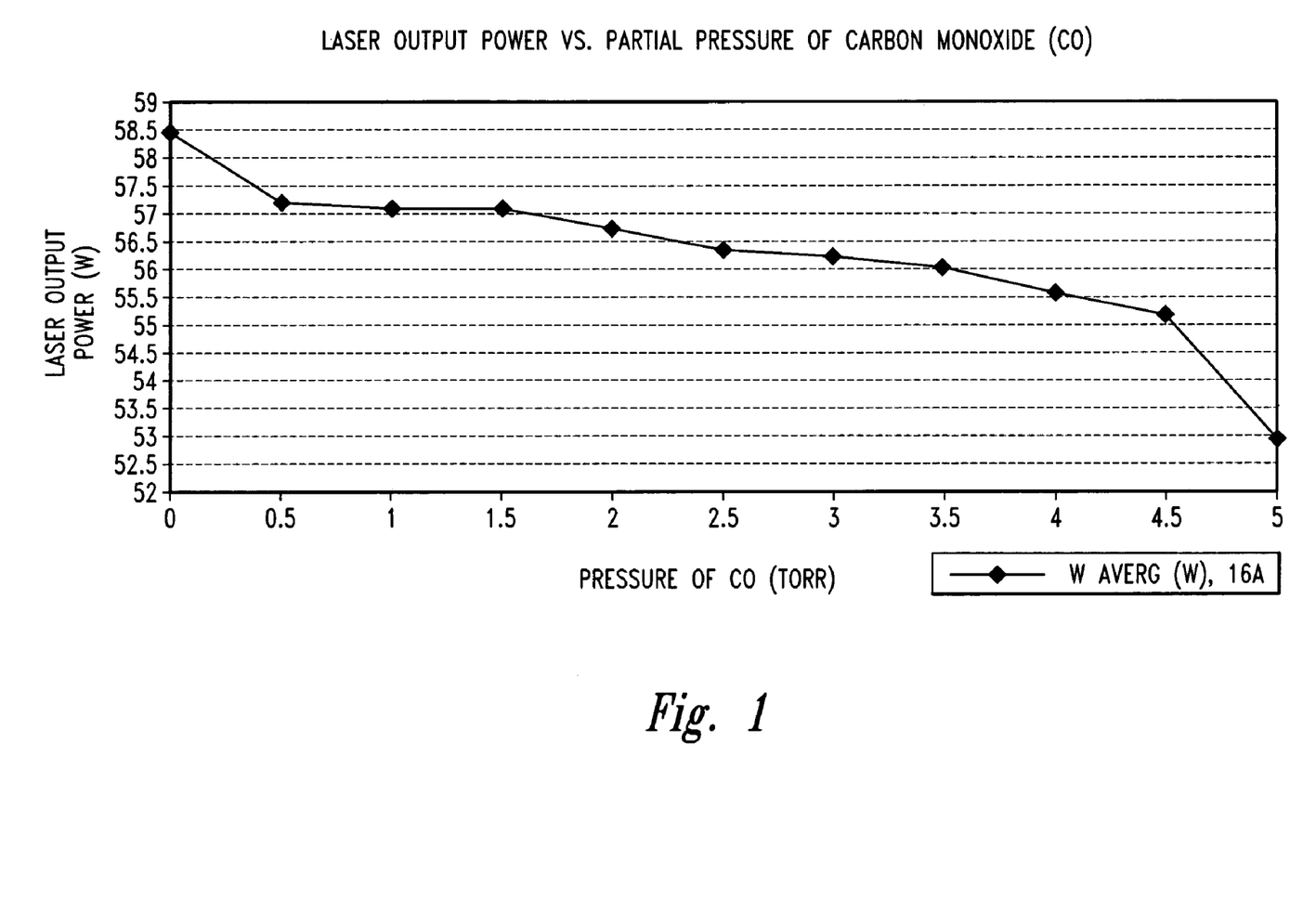
FIG. 1 is a graph illustrating laser output power relative to the partial pressure of CO within a $CO_2$ laser.

During this reaction, $CO_2$ decomposes into CO and $O_2$, leading to the redistribution of potential energy as the concentration of CO and $O_2$ increases. The dissociation reaction is as follows:

Over time, the reaction reaches equilibrium as follows:

A portion of the energy of discharge, as well as the oscillating levels of the nitrogen, are transferred to the oscillating levels of these CO and $O_2$ molecules. The probability of the transfer of this energy from the CO and $O_2$ to the $CO_2$ molecules is low. The duration of the vibrational states of the CO and $O_2$ molecules is less than that of the nitrogen. Thus, some of the discharge energy will be transferred to the CO and $O_2$ molecules and will not participate in the creation of the population inversion between the oscillating levels of $CO_2$. Accordingly, the concentration of CO and $O_2$ is inversely related to the power output such that higher concentrations of CO and $O_2$ in the mixture cause lower output power. The graph in FIG. 1, for example, represents laser output power relative to the partial pressure of CO within a $CO_2$ laser with 50-watt rated output power. As the graph illustrates, the output power decreases significantly as the concentration of CO in the gas mixture increases.

One solution to the problem with dissociation has been the use of gold, silver, or other types of metals or metal alloys that provide a catalyst to drive (i.e., oxidize) the CO to $CO_2$. Many conventional systems, for example, include gold layers or coatings distributed on the electrodes and/or the walls of the gas containment structure. One drawback with such conventional approaches, however, is that reactions using the gold-plated electrodes and/or wall portions are unpredictable and difficult to control. For example, reacting the gold-plated portions with the laser medium can take a significant amount of time relative to the laser's discharge reaction time, and it can be difficult to activate the gold catalyst for the reaction between the gold-plated portions and the laser gas medium. In addition, coating the electrodes and/or portions of the walls within the containment structure can be extremely expensive and time-consuming. Accordingly, there is a need to improve the systems and methods for operating $CO_2$ lasers.

DETAILED DESCRIPTION

A. Overview

The present disclosure is directed generally toward lasers and, more particularly, to gas lasers including nanoscale catalysts and methods for utilizing nanoscale catalysts in such lasers. A gas laser in accordance with one embodiment of the invention, for example, includes a gas containment structure having a gas discharge region and a laser gas medium in the gas discharge region. The gas laser also includes a first optical element and a second optical element spaced apart from each other at opposite ends of the gas discharge region to form a laser resonator. The gas laser further includes a nanoscale catalyst proximate to and in communication with the gas discharge region to modify oxidation and/or decomposition processes of selected components of the laser gas medium. In one embodiment, the nanoscale catalyst can include a metal-oxide support substrate carrying a plurality of nanoscale particulates. The nanoscale particulates can be composed of one or more of the following: gold, silver, or platinum, and have an average size of about 1-50 nm.

The gas laser can have several different configurations. In one embodiment, for example, the gas containment structure includes a first end and a second end opposite the first end. A first end-cap assembly at the first end carries the first optical element and a second end-cap assembly at the second end carries the second optical element. The nanoscale catalyst can be carried by the second end-cap assembly such that the second optical element is between the nanoscale catalyst and the gas discharge region. In another embodiment, the gas laser can include another nanoscale catalyst carried by the first end-cap assembly and proximate to the first optical element.

Another embodiment is directed to a method for operating a gas laser. The gas laser includes a gas containment structure with a gas discharge region and a laser gas medium in the gas discharge region. The gas laser also includes a nanoscale catalyst proximate to and in communication with the gas discharge area. The method includes energizing the laser gas medium and modifying oxidation and/or decomposition processes of selected components of the laser gas medium by introducing a nanoscale catalyst into the laser gas medium.

Many specific details of certain embodiments of the invention are set forth in the following description and in FIGS. 2A-4 to provide a thorough understanding of these embodiments. A person skilled in the art, however, will understand that the invention may be practiced without several of these details or additional details can be added to the invention. Well-known structures and functions have not been shown or described in detail to avoid unnecessarily obscuring the description of the embodiments of the invention. Where the context permits, singular or plural terms may also include the plural or singular term, respectively. Moreover, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Additionally, the term "comprising" is used throughout to mean including at least the recited feature(s) such that any greater number of the same feature and/or additional types of features are not precluded.

Figure 2A:
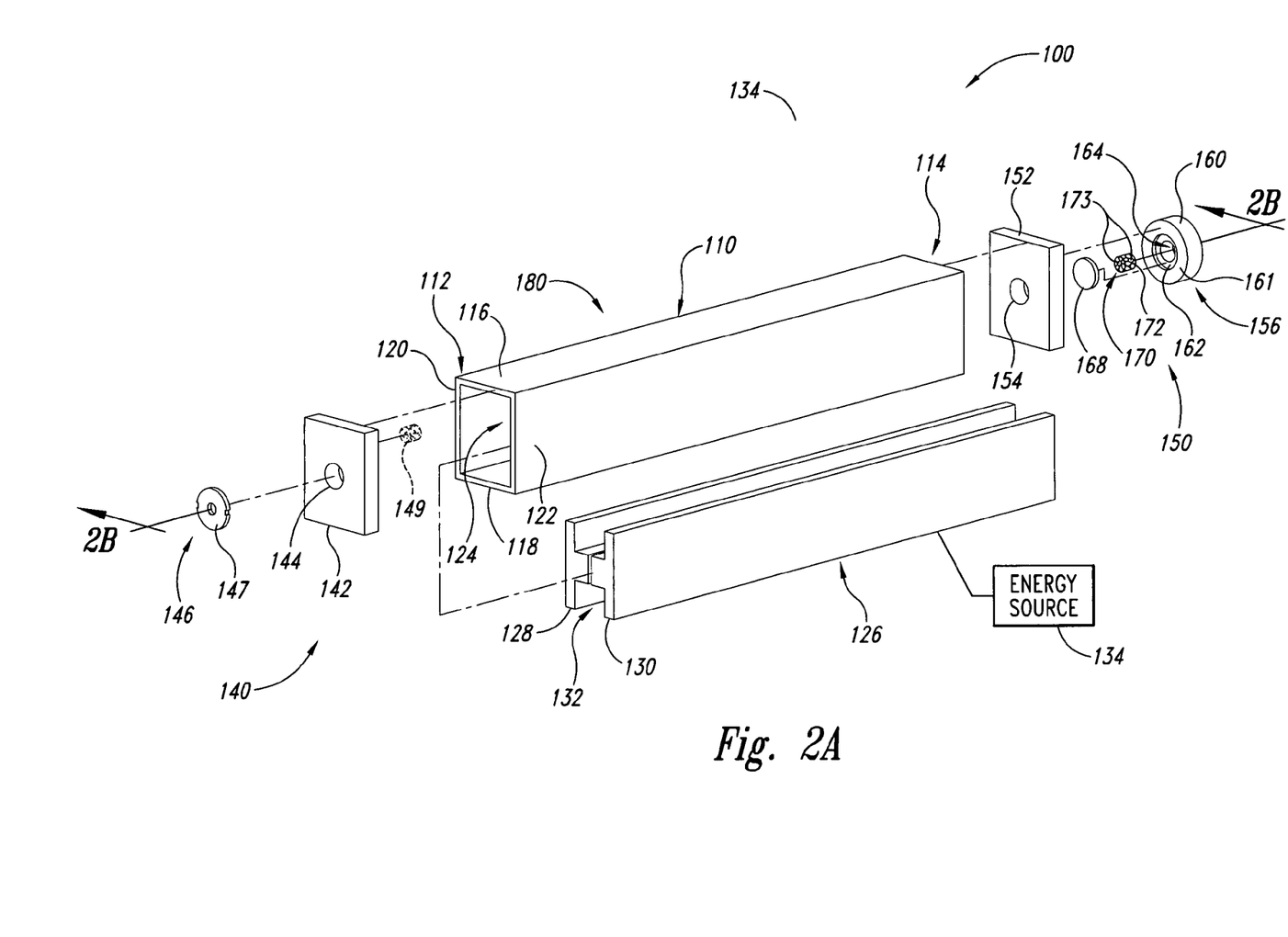
FIG. 2A is a partially schematic, exploded isometric view of a gas laser including a catalyst unit configured in accordance with an embodiment of the invention.

B. Embodiments of Gas Lasers Including Nanoscale Catalysts and Methods for Using Such Lasers FIG. 2A is a partially schematic, exploded isometric view of a gas laser 100 configured in accordance with an embodiment of the invention. The laser 100 includes a laser tube or housing 110 having a first or front end 112 and a second or rear end 114 opposite the first end 112. The laser 100 also includes a first or front end-cap assembly 140 at the first end 112 and a second or rear end-cap assembly 150 at the second end 114. The tube 110, first end-cap assembly 140, and second end-cap assembly 150 define, at least in part, a gas containment structure 180. The laser system 100 further includes a nanoscale catalyst unit or insert 170 carried by at least one of the first and second end-cap assemblies 140 and 150. The nanoscale catalyst unit 170 includes a plurality of nanoscale catalyst elements 172 having nanoscale particulates. The nanoscale catalyst elements 172 are in communication with a laser gas medium (not shown) in the gas containment structure 180 and configured to modify or otherwise affect the oxidation and/or decomposition processes of selected components of the laser gas medium during operation. Compared to conventional catalyst structures described above, the nanoscale catalyst elements 172 are expected to (a) mitigate oxidation and/or decomposition processes in the laser gas medium more effectively than conventional catalysts to maintain higher laser power throughout processing and increasing the life of the laser 100, (b) improve the laser's response time as compared with lasers including conventional catalysts because the nanoscale catalyst elements 172 have very short activation times, and (c) reduce total processing time because of the faster response time and faster operation of the laser 100.

The laser tube 110 in the illustrated embodiment includes a top wall 116, a bottom wall 118, and opposing side walls 120 and 122 that define a chamber 124 configured to receive an electrode assembly 126. The tube 110 is an extruded metal tube composed of a suitable metal or metal alloy. In other embodiments, however, the tube 110 can be composed of ceramic or other suitable materials. The electrode assembly 126 includes electrodes 128 and 130 spaced apart from each other by a gap or gas discharge region 132. The laser 100 further includes an energy source 134 (shown schematically) operably coupled to at least one of the electrodes 128 and 130 and configured to deliver energy to activate or energize the laser gas medium (not shown). The energy source 134 can include, for example, an RF energy source, a microwave generator, a DC power source, or other suitable energy source in accordance with the particular configuration of the laser 100. In other embodiments, the energy source 134 can also include a light source in addition to the energy sources listed previously.

The first end-cap assembly 140 includes a first plate or end-cap 142 and a first optical subassembly 146 carried by the first plate 142. The first plate 142 is configured to sealably close against the first end 112 of the laser tube 110 using a plurality of fasteners (not shown), an adhesive material, a welding process, or another suitable method. The first plate 142 also includes a first aperture or opening 144 configured to receive at least a portion of the first optical subassembly 146 and precisely align the first optical subassembly 146 relative to the laser tube 110 and the second end-cap assembly 150. In the illustrated embodiment, the first optical subassembly 146 includes a first optical element 147 (e.g., a mirror, reflective optical element, or other type of lens). The first optical subassembly 146 can optionally include a number of other lenses or optical elements. The first end-cap assembly 140 can also include a desiccant 149 (shown schematically in broken lines) positioned to absorb water vapor within the gas containment structure 180 to reduce problems associated with water vapor within the laser system 100 and help extend the life of the laser. The desiccant 149 is an optional component that is not necessary and may not be included in some embodiments.

The second end-cap assembly 150 at the second end 114 of the laser tube 110 includes a second plate or end-cap 152, a second optical subassembly 156 carried by the second plate 152, and the catalyst unit 170. The second plate 152 is configured to sealably close against the second end 114 using methods and/or processes similar to those used to secure the first plate 142 against the first end 112 of the laser tube 110 as described above. The second plate 152 includes a second aperture or opening 154 configured to receive at least a portion of the second optical subassembly 156 and precisely align the optical component(s) of the second optical subassembly 156 relative to the first optical subassembly 146 at the opposite end of the laser tube 110. The first and second end-cap assemblies 140 and 150 together accordingly form a laser resonator aligned with the gas discharge region 132 for producing directional optical energy in and emanating from the discharge region.

The second optical subassembly 156 includes an optical housing 160 and a second optical element 168 (e.g., a mirror or other reflective optical element) carried or otherwise supported by the optical housing 160. In the illustrated embodiment, for example, the optical housing 160 includes a first annular portion 161, a second annular portion 162 having a diameter less than the diameter of the first annular portion 161, and an aperture 164 extending completely through the optical housing 160. The diameter of the second annular portion 162 is sized to correspond at least in part with the outer diameter of the second optical element 168 such that the second optical element is received within at least a portion of the optical housing 160. In other embodiments, however, the second optical subassembly 156 can have a different arrangement and/or include different features.

Figure 2B:
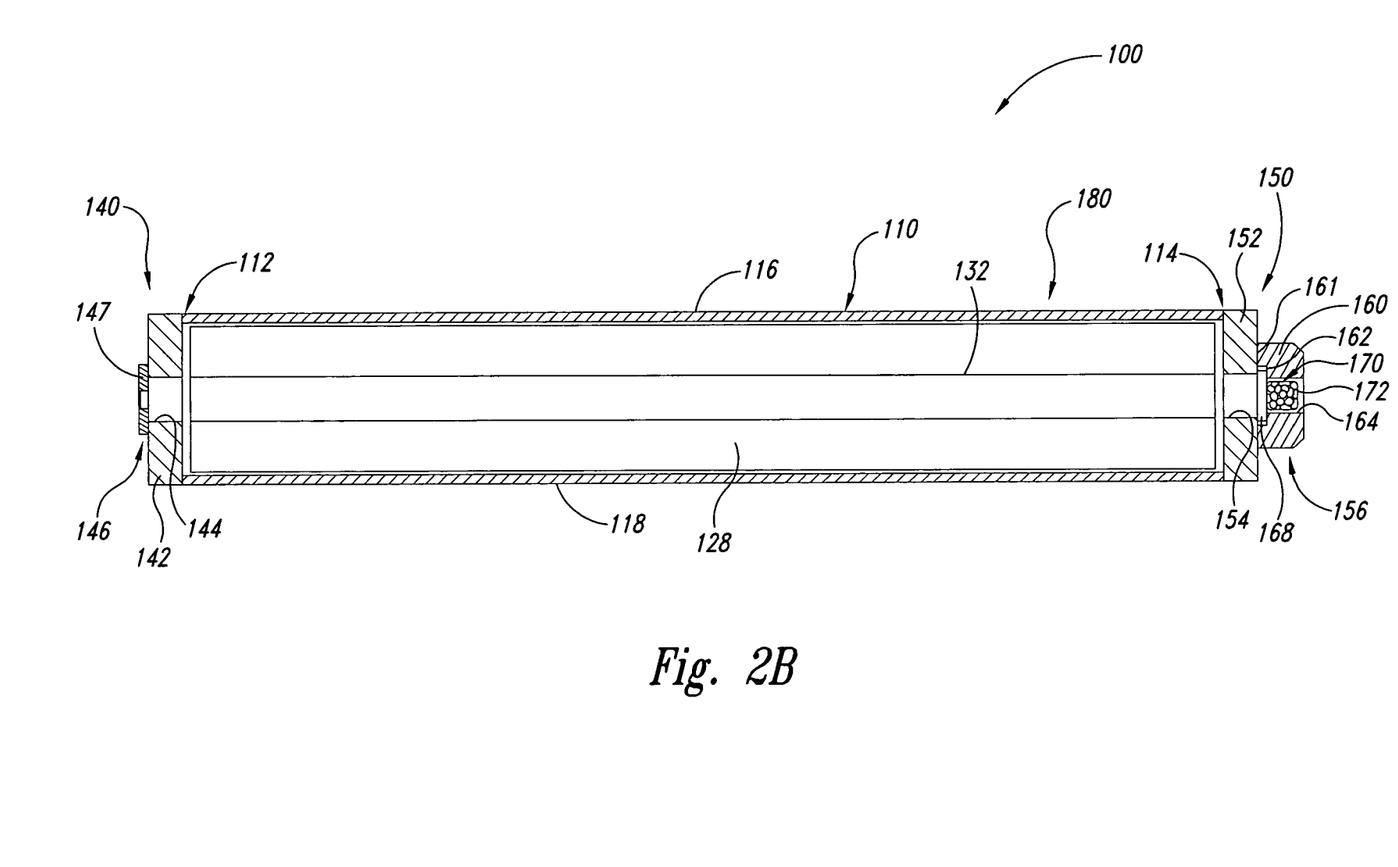
FIG. 2B is a partially schematic, side cross-sectional view of the gas laser of FIG. 2A taken substantially along the line 2B-2B.

FIG. 2B is a partially schematic, side cross-sectional view of the laser 100 taken substantially along line 2B-2B of FIG. 2A. Referring to FIGS. 2A and 2B together, the nanoscale catalyst unit 170 including the nanoscale catalyst elements 172 is positioned within at least a portion of the aperture 164. The individual nanoscale catalyst elements 172 can include nanoscale gold, silver, and/or platinum particulates having an average size of approximately 1-50 nm and, in many situations, about 1-20 nm. A plurality of nanoscale particulates are carried or otherwise supported by a metal-oxide support substrate 173 (e.g., titanium oxide, aluminum oxide, or other suitable material) to form the individual nanoscale catalyst elements 172.

As mentioned previously, the nanoscale catalyst elements 172 are configured to modify the oxidation and/or decomposition processes of selected components of the laser gas medium during operation of the laser. More specifically, the nanoscale particulates of the nanoscale catalyst elements 172 interact with stable molecules of $O_2$ to oxidize CO and increase the concentration of $CO_2$ in the laser gas medium. The effectiveness of the nanoscale particulates in such reactions approaches approximately 100% at temperatures of about 0° C. or higher. Furthermore, the nanoscale particulates have very short activation times as compared to the conventional gold- or metal-plated catalyst structures described previously. Thus, the nanoscale catalyst elements 172 including the nanoscale particulates are expected to mitigate oxidation and/or decomposition processes in the laser gas medium more effectively than such conventional structures. The laser 100 is accordingly expected to have fast response times and maintain high power output throughout processing.

As best seen in FIG. 2B, the nanoscale catalyst unit 170 is positioned in the aperture 164 of the optical housing 160 such that the second optical element 168 is between the nanoscale catalyst elements 172 and the gas discharge region 132. Although the nanoscale catalyst elements 172 are isolated from direct physical contact with the gas discharge region 132, the nanoscale catalyst elements 172 are in communication with the laser gas medium (not shown) in the gas discharge region 132. It is not necessary that the nanoscale catalyst elements 172 be in direct contact or directly adjacent to a plasma (not shown) in the gas discharge region 132 to be effective. For example, the nanoscale particulates of the nanoscale catalyst elements 172 at a distal end of the gas discharge region 132 are highly effective at modifying the oxidation and/or decomposition processes throughout the entire gas discharge region 132. Conversely, in most conventional laser systems the catalyst structures (e.g., gold- or metal-plated electrodes or wall portions) are positioned throughout all or a substantial portion of the gas discharge region 132 and in direct proximity to the plasma. This arrangement is necessary with such conventional systems because the plated catalyst portions need to be in direct contact with the plasma to be effective. One problem with this arrangement, however, is that ultraviolet radiation and/or other wavelengths of light within the plasma can negatively affect or destroy the catalyst material during operation. Nanoscale particulates are particularly susceptible to damage from such radiation. In contrast with conventional systems, the nanoscale catalyst unit 170 in the laser 100 is positioned behind the second optical element 168 and out of direct contact with the plasma. The nanoscale catalyst elements 172 are accordingly shielded or otherwise protected from the ultraviolet radiation and/or other wavelengths of light within the plasma that can negatively affect or destroy the nanoscale particulates. This feature is also expected to allow existing laser systems to be easily retrofitted because only the second end-cap assembly 150 has to be modified or replaced to include the nanoscale catalyst unit 170.

The nanoscale catalyst unit 170 can include a preselected volume of nanoscale catalyst elements 172. The total volume of nanoscale catalyst elements 172 can be selected based on the particular configuration of the laser 100, the composition of the laser gas medium, the operational requirements of the laser, and/or a number of other factors. One advantage of installing a desired volume of nanoscale catalyst elements 172 with the laser 100 is that a sufficient volume of catalytic material will be available throughout operation of the laser 100 to interact with stable molecules of $O_2$ to oxidize CO and increase the concentration of $CO_2$ in the laser gas medium. This feature is also expected to reduce operating costs of the laser 100 as compared with conventional systems because excess amounts of catalytic material will not be required during operation. Rather, a precise volume of nanoscale catalyst elements 172 can be placed in the laser 100 for a particular application.

In addition to the various advantages discussed above, the nanoscale catalyst elements 172 including nanoscale particulates include a number of other advantages as compared with conventional gold- or metal-plated catalyst structures. For example, the nanoscale catalyst elements 172 can be used in lasers with high gas pressures and short current pulses (e.g., TEA lasers). Furthermore, the nanoscale-catalyst elements 172 can be used in lasers having a variety of different gas discharges (e.g., DC, pulse, short pulse, and/or RF).

Figure 3:
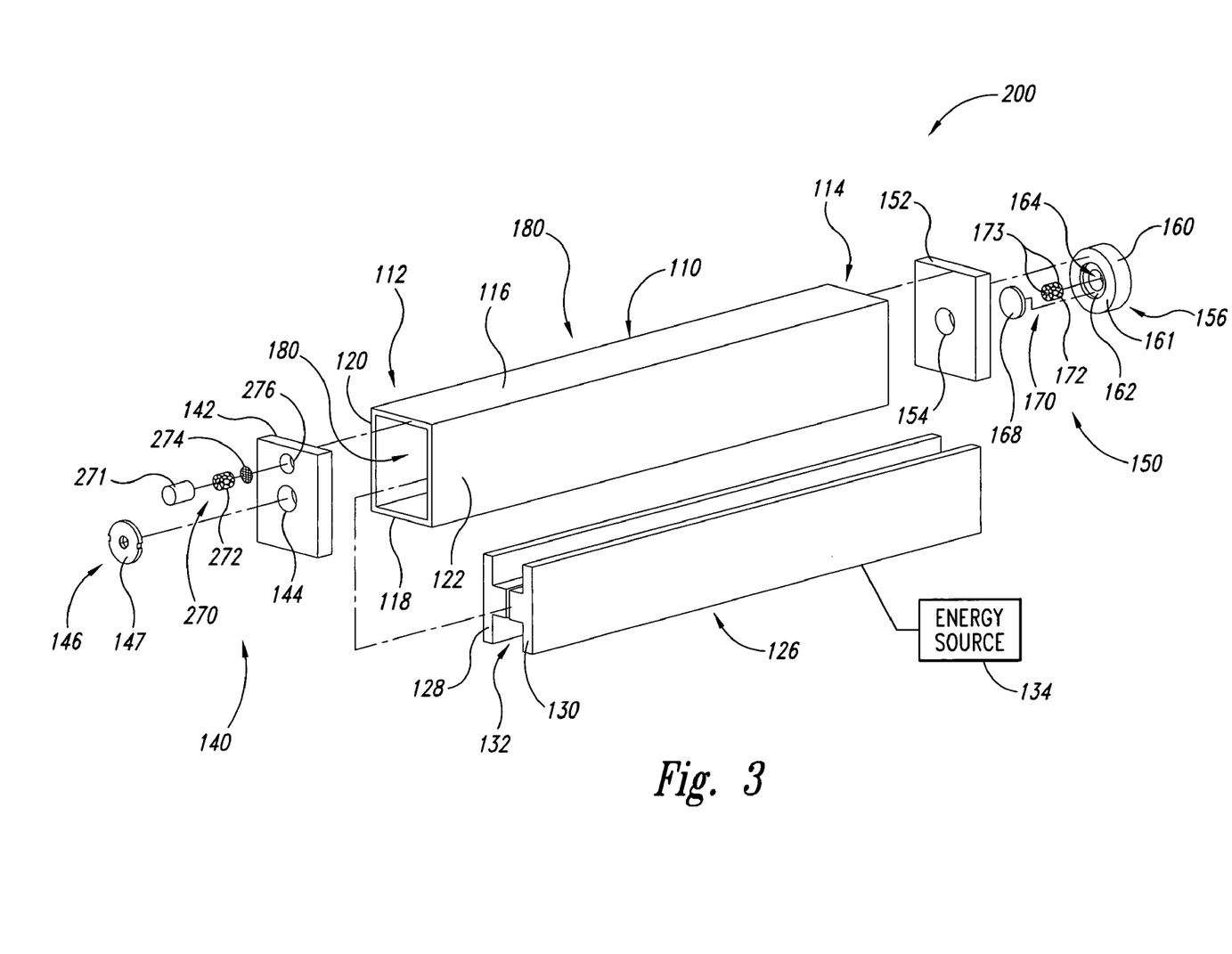
FIG. 3 is an exploded isometric view of a gas laser including a plurality of catalyst units configured in accordance with another embodiment of the invention.
Figure 4:
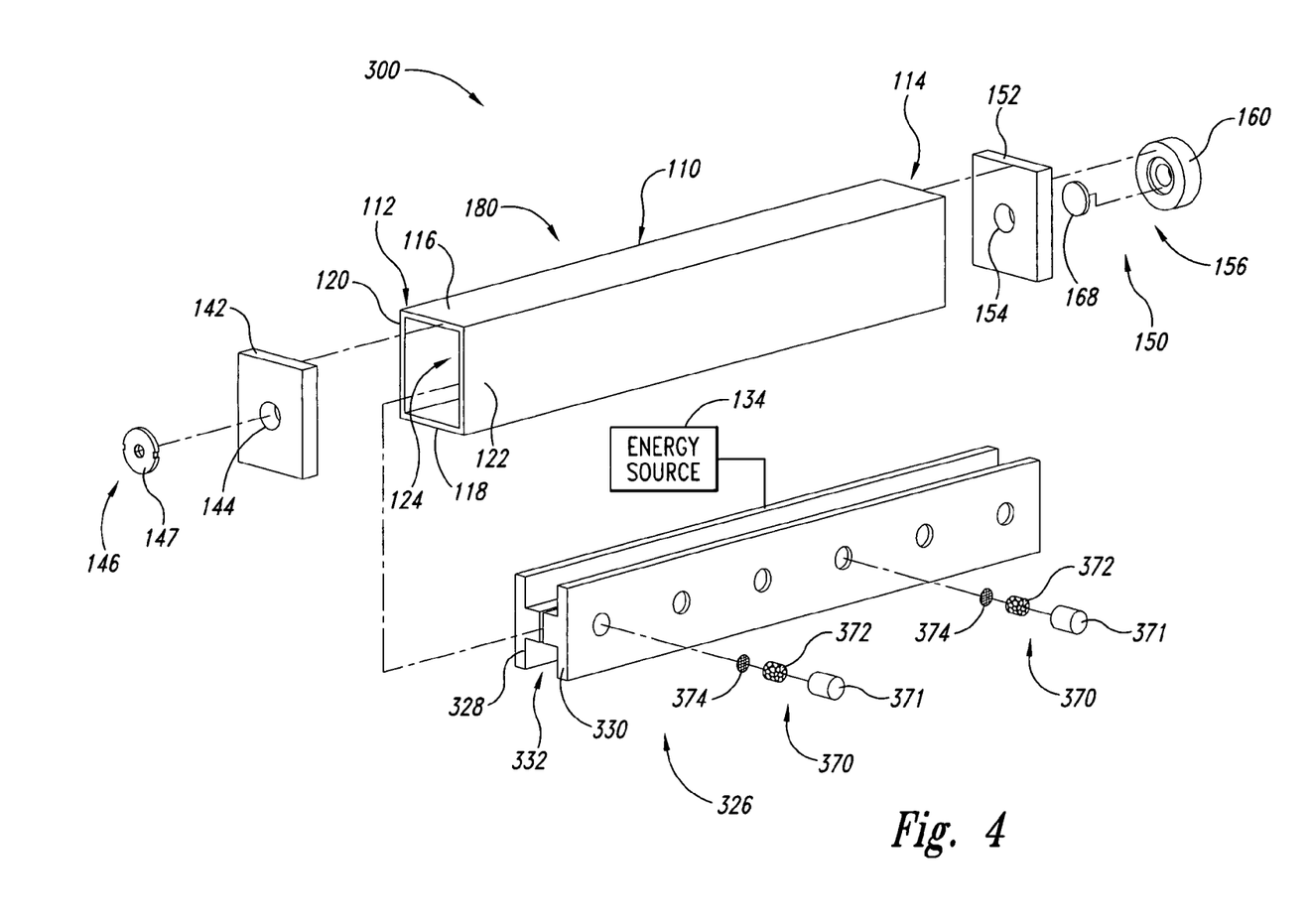
FIG. 4 is an isometric view of a gas laser including a plurality of catalyst units configured in accordance with still another embodiment of the invention.

C. Additional Embodiments of Gas Lasers Including Nanoscale Catalysts and Methods for Producing Such Systems FIGS. 3 and 4 illustrate gas lasers having catalyst units in accordance with several additional embodiments of the invention. These lasers can include several features generally similar to the laser 100 described above with respect to FIGS. 2A and 2B. Accordingly, like reference numbers are used to refer to like components in FIGS. 2A and 2B and FIGS. 3 and 4. The lasers described below can also have many of the same advantages as the laser 100 described above.

FIG. 3, for example, is an exploded isometric view of a gas laser 200 configured in accordance with another embodiment of the invention. The laser 200 differs from the laser 100 described above with respect to FIGS. 2A and 2B in that the laser 200 includes a nanoscale catalyst unit in each end-cap assembly 140 and 150, rather than just the single nanoscale catalyst unit 170 installed with the second end-cap assembly 150 of the laser 100. More specifically, the laser 200 includes a nanoscale catalyst unit 270 installed with the first end-cap assembly 140 and in communication with the gas discharge region 132. The nanoscale catalyst unit 270 includes a nanoscale catalyst receptacle or housing 271, nanoscale catalyst elements 272 having nanoscale particulates carried by the receptacle 271, and a gas-permeable barrier 274 (e.g., a screen or mesh) configured to hold the nanoscale catalyst elements 272 within the receptacle 271. The receptacle 271 can be composed of metal, ceramic, or another suitable material that does not react with or otherwise affect the nanoscale particulates of the nanoscale catalyst elements 272. The nanoscale catalyst elements 272 can be generally similar to the nanoscale catalyst elements 172 described above. In the illustrated embodiment, for example, the nanoscale catalyst elements 172 and 272 are composed of the same materials. In other embodiments, however, the nanoscale catalyst elements 172 carried by the second end-cap assembly 150 can have a different composition than the nanoscale catalyst elements 272 carried by the first end-cap assembly 140.

In the illustrated embodiment, the nanoscale catalyst unit 270 is removably carried by the first plate 142. More specifically, the first plate 142 includes an aperture 276 sized to receive the receptacle 271 and the gas-permeable barrier 274. In operation, a desired volume of the nanoscale catalyst elements 272 is deposited into the receptacle 271, the gas-permeable barrier 274 is placed over the open end of the receptacle 271, and the assembled catalyst unit 270 is placed in the aperture 276. In other embodiments, the catalyst unit 270 can include other features and/or have a different arrangement. For example, the nanoscale catalyst unit 270 can be installed at a different portion of the first end-cap assembly 140.

FIG. 4 is an exploded isometric view of a gas laser 300 configured in accordance with still another embodiment of the invention. The laser 300 differs from the lasers 100 and 200 described above with respect to FIGS. 2A-3 in that the laser 300 includes a plurality of nanoscale catalyst units carried by an electrode assembly 326 rather than in each end-cap assembly 140 and 150. More specifically, the electrode assembly 326 includes electrodes 328 and 330 spaced apart from each other by a gas or gas discharge region 332. A plurality of nanoscale catalyst units or inserts 370 (only two are shown) are carried by at least one of the electrodes 328 and 330 and in communication with the gas discharge region 332.

The individual nanoscale catalyst units 370 include (a) a nanoscale-catalyst receptacle or housing 371, (b) nanoscale catalyst elements 372 having nanoscale particulates carried by the receptacle 371, and (c) a gas-permeable barrier 374 (e.g., a screen or mesh) configured to hold the nanoscale catalyst elements 372 within the receptacle 371. The receptacles 371 can be composed of metal, ceramic, or another suitable material that does not react with or otherwise affect the nanoscale particulates of the catalyst elements 372. The nanoscale catalyst elements 372 can be generally similar to the nanoscale catalyst elements 172 and 272 described above. In operation, a desired volume of the nanoscale catalyst elements 372 are deposited into each receptacle 371, the corresponding gas-permeable barriers 374 are placed over the open end of each receptacle 371, and the assembled electrode assembly 326 is installed with the laser tube 110. In other embodiments, the electrode assembly 326 and/or the nanoscale catalyst units 370 can have a different arrangement or include different features.

From the foregoing, it will be appreciated that specific embodiments of the invention have been described herein for purposes of illustration, but that various modifications may be made without deviating from the spirit and scope of the invention. For example, one or more nanoscale catalyst units can be installed at different locations in the laser in addition to, or in lieu of, the first end-cap assembly 140, the second end-cap assembly 150, and/or the electrode assembly 326. Furthermore, the nanoscale catalyst units 170 can be placed in a separate receptacle or housing before being installed with the second end-cap assembly 150. Aspects of the invention described in the context of particular embodiments may be combined or eliminated in other embodiments. For example, various features described above in the context of $CO_2$ lasers can be utilized in other types of gas lasers. Moreover, the $CO_2$ lasers described above can have different features and/or arrangements. Further, while advantages associated with certain embodiments of the invention have been described in the context of these embodiments, other embodiments may also exhibit such advantages, and not all embodiments need necessarily exhibit such advantages to fall within the scope of the invention. Accordingly, the invention is not limited except as by the appended claims.

We claim:

1. A gas laser, comprising:
    a gas containment structure including a gas discharge region;
    a laser gas medium in the gas discharge region;
    a plurality of optical elements spaced apart from each other at opposite ends of the gas discharge region to form a laser resonator; and
    a nanoscale catalyst at least proximate to one of the optical elements and in proximity to and in communication with the gas discharge region to modify oxidation and/or decomposition processes of selected components of the laser gas medium.

2. The gas laser of claim 1 wherein the nanoscale catalyst comprises a metal-oxide support substrate carrying a plurality of nanoscale particulates.

3. The gas laser of claim 2 wherein the nanoscale particulates comprise one or more of the following: gold, silver, or platinum particulates.

4. The gas laser of claim 2 wherein the nanoscale particulates have an average size of about 1-50 nm.

5. The gas laser of claim 2 wherein the nanoscale particulates have an average size of about 1-20 nm.

6. The gas laser of claim 1 wherein the gas containment structure includes a laser tube having a first end and a second end opposite the first end, and wherein the gas laser further comprises:
    a first end-cap assembly at the first end and a second end cap assembly at the second end; and
    a first optical element carried by the first end-cap assembly and a second optical element carried by the second end-cap assembly, and wherein the nanoscale catalyst is carried by the second end-cap assembly.

7. The gas laser of claim 6 wherein the nanoscale catalyst is a first nanoscale catalyst, and wherein the gas laser further comprises a second nanoscale catalyst carried by the first end-cap assembly.

8. The gas laser of claim 7, further comprising a catalyst receptacle configured to be installed with the first end-cap assembly and a gas-permeable barrier configured to sealably close against the receptacle, and wherein the second nanoscale catalyst is carried within the catalyst receptacle.

9. The gas laser of claim 7 wherein the first nanoscale catalyst and the second nanoscale catalyst are composed of the same material.

10. The gas laser of claim 7 wherein the first nanoscale catalyst and the second nanoscale catalyst are composed of different materials.

11. The gas laser of claim 1 wherein:
    the laser gas medium includes carbon dioxide ($CO_2$), carbon monoxide (CO), and oxygen ($O_2$); and
    the nanoscale catalyst enhances oxidation of the CO to increase the concentration of $CO_2$ and/or decrease the concentration of $O_2$ and CO in the laser gas medium.

12. The gas laser of claim 1, further comprising:
a pair of substantially parallel electrodes carried by the gas containment structure and spaced apart from each other to define, at least in part, the gas discharge region.

13. The gas laser of claim 1, further comprising an energy source configured to energize the laser gas medium in the gas discharge region, wherein the energy source comprises one or more of the following: an RF source, a microwave source, a DC power source, or a light source.

14. A gas laser, comprising:
a gas containment structure including a laser tube having a first end and a second end opposite the first end, a first end-cap assembly sealably closed against the first end, and a second end-cap assembly sealably closed against the second end;
a pair of substantially parallel electrodes in the laser tube and spaced apart from each other by a gas discharge region;
a plurality of optical elements including at least a first optical element carried by the first end-cap assembly and a second optical element carried by the second end cap assembly to form a laser resonator in at least a portion of the gas discharge region;
a laser gas medium including $CO_2$ in the gas discharge region; and
a nanoscale catalyst unit carried by the second end-cap assembly with the second optical element between the catalyst unit and the gas discharge region, the catalyst unit being in communication with the gas discharge region to modify oxidation and/or decomposition processes of selected components of the laser gas medium.

15. The gas laser of claim 14 wherein the nanoscale catalyst unit comprises a plurality of nanoscale catalyst elements, the individual catalyst elements including a metal-oxide support substrate carrying a plurality of nanoscale particulates.

16. The gas laser of claim 15 wherein the nanoscale particulates comprise one or more of the following: gold, silver, or platinum particulates.

17. The gas laser of claim 15 wherein the nanoscale particulates have an average size of about 1-50 nm.

18. The gas laser of claim 15 wherein the nanoscale particulates have an average size of about 1-20 nm.

19. The gas laser of claim 15 wherein the quantity of nanoscale catalyst elements is preselected based on the composition of the laser gas medium.

20. The gas laser of claim 14 wherein the nanoscale catalyst unit is a first nanoscale catalyst unit carried by the first end-cap assembly, and wherein the gas laser further comprises a second nanoscale catalyst unit carried by the second end-cap assembly and in communication with the gas discharge region to modify oxidation and/or decomposition processes of selected components of the laser gas medium.

21. The gas laser of claim 20 wherein the second nanoscale catalyst unit comprises (a) a nanoscale catalyst receptacle carrying a plurality of second nanoscale catalyst elements, the individual second nanoscale catalyst elements having nanoscale particulates, and (b) a gas-permeable barrier between the second nanoscale catalyst elements and the gas discharge region.

22. The gas laser of claim 14 wherein:
the laser gas medium further comprises CO and $O_2$; and
the nanoscale catalyst unit includes a nanoscale catalyst having nanoscale particulates, and wherein the nanoscale particulates interact with stable molecules of $O_2$ to oxidize CO and increase the concentration of $CO_2$ in the laser gas medium.

23. A gas laser, comprising:
a laser gas mixture including $CO_2$;
means for energizing the laser gas mixture; and
a plurality of nanoscale catalyst elements at least proximate to an end portion of the laser and in communication with the energized laser gas mixture, the individual nanoscale catalyst elements including a plurality of nanoscale particulates to interact with CO and/or one or more energetic forms of oxygen within the energized laser gas mixture to increase concentration of $CO_2$.

24. A method for operating a gas laser having a gas containment structure with a gas discharge region, a laser gas medium in the gas discharge region, and a nanoscale catalyst at least adjacent to an optical element of the laser and proximate to and in communication with the gas discharge region, the method comprising:
energizing the laser gas medium; and
modifying oxidation and/or decomposition processes of selected components of the laser gas medium by introducing the nanoscale catalyst into the laser gas medium.

25. The method of claim 24 wherein energizing the laser gas medium comprises energizing the laser gas medium with one or more of the following: an RF source, a microwave source, a DC power source, or a light source.

26. The method of claim 24 wherein modifying oxidation and/or decomposition processes comprises introducing gold, silver, and/or platinum nanoscale particulates into the laser gas medium.

27. The method of claim 24 wherein modifying oxidation and/or decomposition processes comprises introducing a nanoscale catalyst with nanoscale particulates having an average size of about 1-50 nm to the laser gas medium.

28. The method of claim 24 wherein modifying oxidation and/or decomposition processes comprises introducing a nanoscale catalyst with nanoscale particulates having an average size of about 1-20 nm to the laser gas medium.

29. The method of claim 24 wherein:
the laser gas medium includes $CO_2$, CO, and $O_2$; and
modifying oxidation and/or decomposition processes comprises introducing the nanoscale particulates into the laser gas medium to enhance the oxidation of the CO to increase the concentration of $CO_2$ and/or decrease the concentration of $O_2$ and CO in the laser gas medium.

30. The method of claim 24 wherein the gas laser further comprises a plurality of optical elements including at least a first optical element and a second optical element spaced apart from each other at opposite ends of the gas discharge region to form a laser resonator, and wherein the method further comprises:
depositing the nanoscale catalyst adjacent to the second optical element with the second optical element between the nanoscale catalyst and the gas discharge region before energizing the laser gas medium.

31. The method of claim 30 wherein the nanoscale catalyst is a first nanoscale catalyst element, and wherein the method further comprises:
depositing a second nanoscale catalyst having nanoscale particulates proximate to the first optical element and in communication with the gas discharge region before energizing the laser gas medium.

32. A method for operating a laser, the method comprising:
providing a gas laser having a gas containment structure including a gas discharge region, a plurality of optical elements including at least a first optical element and a second optical element spaced apart from each other at opposite ends of the gas discharge region to form a laser resonator, a laser gas medium including $CO_2$, CO, and $O_2$ in the gas discharge region, and a nanoscale catalyst having nanoscale particulates at least proximate to one of the optical elements and proximate to and in communication with the gas discharge region; and increasing the formation rate of $CO_2$ in the laser gas medium.

33. The method of claim 32 wherein providing a gas laser including a nanoscale catalyst having nanoscale particulates comprises providing nanoscale catalyst elements having a plurality of nanoscale particulates including one or more of the following: gold, silver, or platinum, and having an average size of about 1-20 nm.

34. The method of claim 32 wherein providing a gas laser including a nanoscale catalyst comprises depositing the nanoscale catalyst adjacent to the second optical element with the some or all of the second optical element between the nanoscale catalyst and the gas discharge region.

35. A gas laser, comprising:

a gas containment structure including a gas discharge region, wherein the gas containment structure includes a laser tube having a first end, a second end opposite the first end, a first end-cap assembly at the first end, and a second end cap assembly at the second end;

a first optical element carried by the first end-cap assembly and a second optical element carried by the second end-cap assembly, and wherein the nanoscale catalyst is carried by the second end-cap assembly;

a laser gas medium in the gas discharge region;

a plurality of optical elements spaced apart from each other at opposite ends of the gas discharge region to form a laser resonator; and a first nanoscale catalyst carried by the first end cap assembly and a second nanoscale catalyst carried by the second end cap assembly, wherein the first and second nanoscale catalysts are composed of different materials, and wherein the first and second nanoscale catalysts are each in proximity to and in communication with the gas discharge region to modify oxidation and/or decomposition processes of selected components of the laser gas medium.

36. A gas laser, comprising:

a gas containment structure including a laser tube having a first end and a second end opposite the first end, a first end-cap assembly sealably closed against the first end, and a second end-cap assembly sealably closed against the second end;

a pair of substantially parallel electrodes in the laser tube and spaced apart from each other by a gas discharge region;

a plurality of optical elements including at least a first optical element carried by the first end-cap assembly and a second optical element carried by the second end cap assembly to form a laser resonator in at least a portion of the gas discharge region;

a laser gas medium including $CO_2$ in the gas discharge region; and a nanoscale catalyst unit carried by the second end-cap assembly with the second optical element between the catalyst unit and the gas discharge region, the catalyst unit being in communication with the gas discharge region to modify oxidation and/or decomposition processes of selected components of the laser gas medium, and wherein the quantity of nanoscale catalyst elements is preselected based on the composition of the laser gas medium.

\* \* \* \* \*